United States Patent
Yoshii et al.

(10) Patent No.: US 8,768,944 B2
(45) Date of Patent: Jul. 1, 2014

(54) INFORMATION PROCESSING APPARATUS, INFORMATION PROCESSING METHOD, AND STORAGE MEDIUM

(75) Inventors: Hiroto Yoshii, Tokyo (JP); Katsuhiko Mori, Kawasaki (JP); Shunta Tate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 13/207,190

(22) Filed: Aug. 10, 2011

(65) Prior Publication Data

US 2012/0047182 A1 Feb. 23, 2012

(30) Foreign Application Priority Data

Aug. 18, 2010 (JP) ................. 2010-183383

(51) Int. Cl.
*G06F 7/00* (2006.01)
(52) U.S. Cl.
USPC ......................................................... 707/758
(58) Field of Classification Search
USPC ......................................................... 707/758
See application file for complete search history.

(56) References Cited

U.S. PATENT DOCUMENTS

| | | | |
|---|---|---|---|
| 5,754,686 A | 5/1998 | Harada et al. | |
| 5,781,663 A | 7/1998 | Sakaguchi et al. | |
| 5,835,632 A | 11/1998 | Takasu et al. | |
| 5,982,933 A | 11/1999 | Yoshii et al. | |
| 6,009,199 A | 12/1999 | Ho | |
| 6,035,062 A | 3/2000 | Takasu et al. | |
| 6,052,482 A | 4/2000 | Arai et al. | |
| 6,208,755 B1 | 3/2001 | Mori et al. | |
| 6,212,298 B1 | 4/2001 | Yoshii et al. | |
| 6,233,352 B1 | 5/2001 | Yoshii | |
| 6,373,473 B1 | 4/2002 | Sakaguchi et al. | |
| 6,421,461 B1 | 7/2002 | Arai et al. | |
| 6,671,403 B1 | 12/2003 | Takasu et al. | |
| 7,039,233 B2 | 5/2006 | Mori et al. | |
| 7,577,297 B2 | 8/2009 | Mori et al. | |
| 7,881,524 B2 | 2/2011 | Matsugu et al. | |
| 7,912,253 B2 | 3/2011 | Suzuki et al. | |
| 2003/0233224 A1* | 12/2003 | Marchisio et al. ................ 704/4 |

(Continued)

FOREIGN PATENT DOCUMENTS

JP  2005-339186 A  12/2005

OTHER PUBLICATIONS

U.S. Appl. No. 13/194,640, filed Jul. 29, 2011, Applicants: Yuji Kaneda, et al.

(Continued)

*Primary Examiner* — Truong Vo
(74) *Attorney, Agent, or Firm* — Fitzpatrick, Cella, Harper & Scinto

(57) ABSTRACT

An information processing apparatus comprises: a creation unit adapted to create a query string, which is composed of a plurality of queries; a reading unit adapted to read, from the query string, a query corresponding to a hierarchy of a current node in accordance with the hierarchy; a generation unit adapted to generate a plurality of nodes having a tree structure by dividing a learning pattern set in the current node in accordance with the read query corresponding to the hierarchy; and a modifying unit adapted to modify the tree structure by putting nodes in each hierarchy together into a common node with respect to nodes up to a hierarchy corresponding to a length of the query string among the nodes having the tree structure, which have been generated by the generation unit.

18 Claims, 15 Drawing Sheets

(56) References Cited

U.S. PATENT DOCUMENTS

| | | |
|---|---|---|
| 2003/0233244 A1* | 12/2003 | Kumhyr .................... 705/1 |
| 2006/0074653 A1 | 4/2006 | Mitari et al. |
| 2006/0115157 A1 | 6/2006 | Mori et al. |
| 2009/0089235 A1 | 4/2009 | Torii et al. |
| 2009/0157707 A1 | 6/2009 | Ito et al. |
| 2009/0254539 A1* | 10/2009 | Wen et al. .................... 707/5 |
| 2009/0324060 A1 | 12/2009 | Sato et al. |
| 2010/0329556 A1 | 12/2010 | Mitarai et al. |
| 2011/0075937 A1 | 3/2011 | Tate |
| 2011/0091115 A1 | 4/2011 | Kato et al. |
| 2011/0158535 A1 | 6/2011 | Iio et al. |
| 2011/0158540 A1 | 6/2011 | Suzuki et al. |

OTHER PUBLICATIONS

U.S. Appl. No. 13/207,143, filed Aug. 10, 2011, Applicants: Shunta Tate, et al.

U.S. Appl. No. 13/281,115, filed Oct. 25, 2011, Applicant: Hiroto Yoshii.

U.S. Appl. No. 13/218,976, filed Aug. 26, 2011, Applicants: Yusuke Mitarai, et al.

L. Breiman, et al., "Classification and Regression Trees," Chapman & Hall/CRC, p. 20-27, 36-39 and 228-233, 1984.

\* cited by examiner

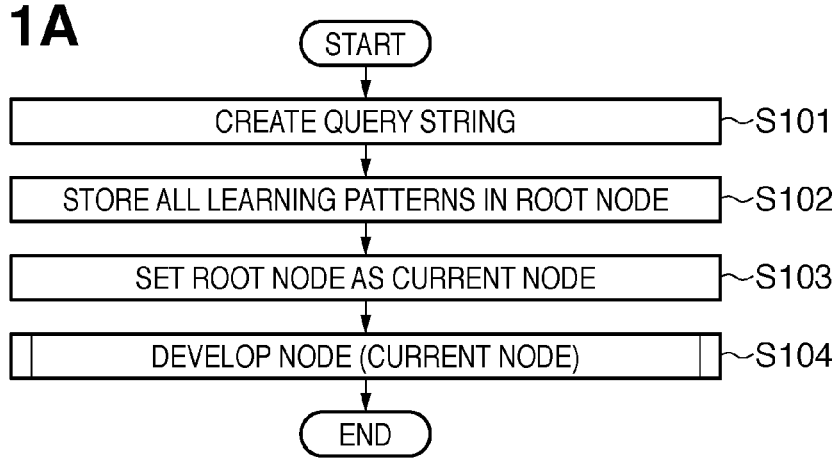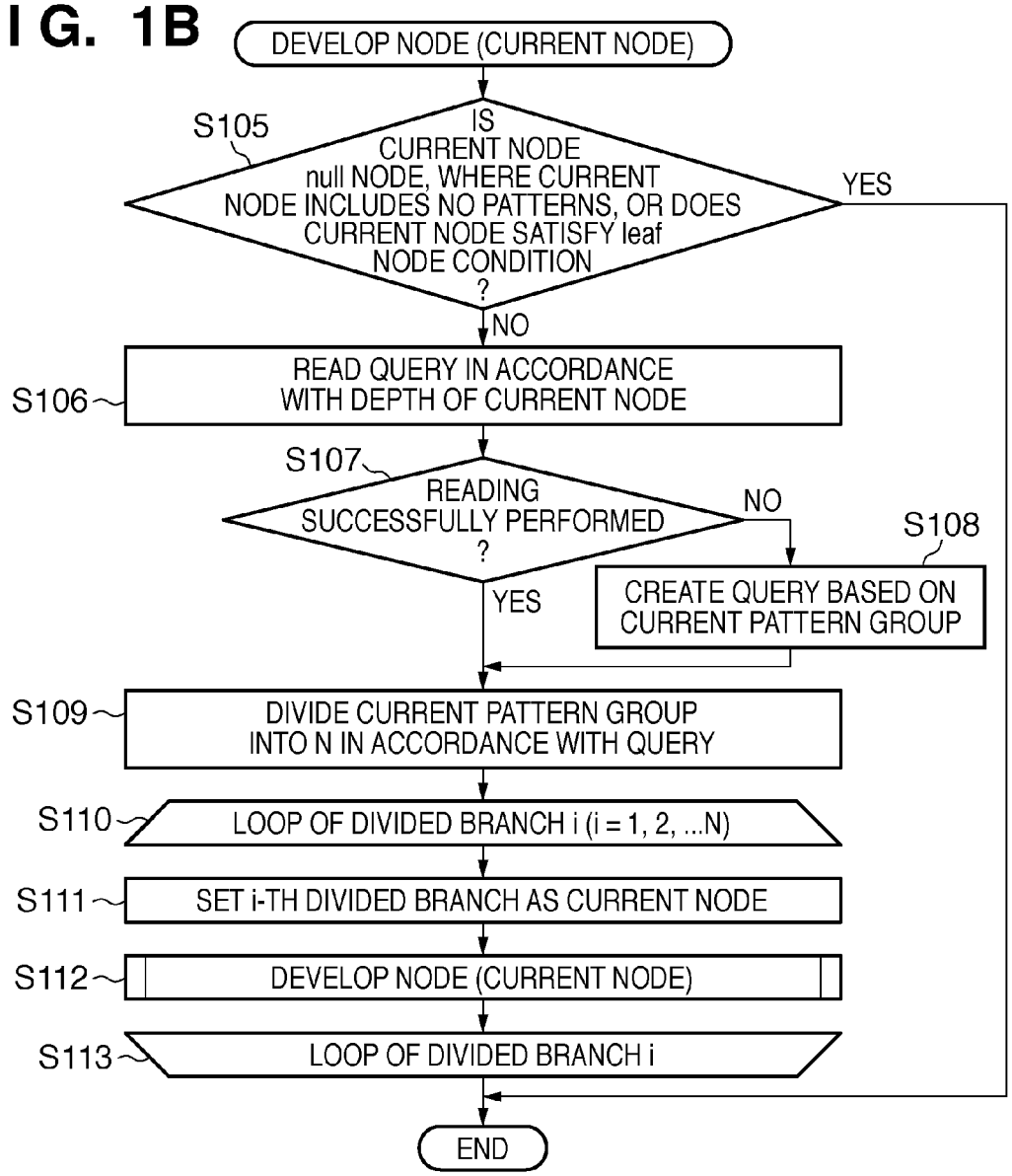

F I G. 10A
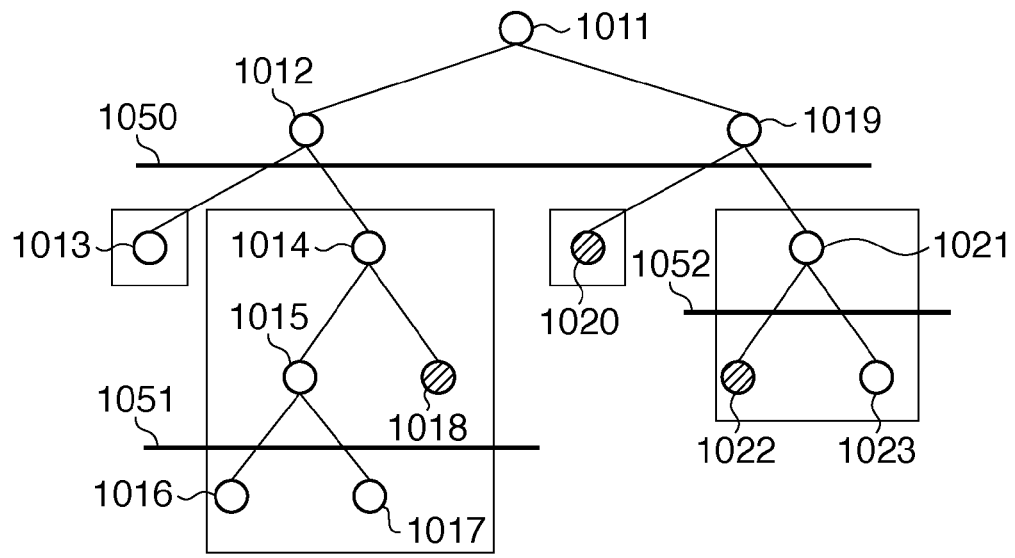
F I G. 10B
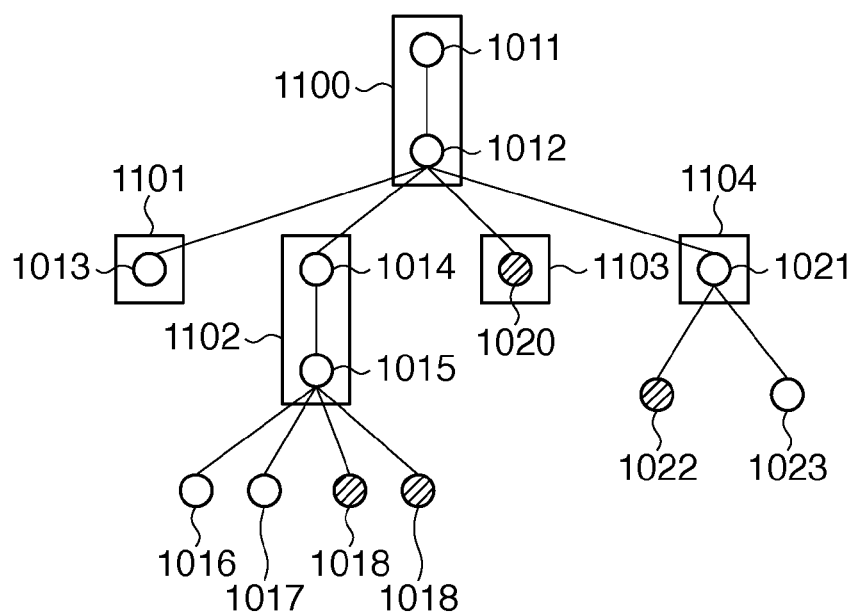

FIG. 14

| BINARY INDICATION | ENTITY NUMBER |
|---|---|
| 0000 | 1301 |
| 0001 | 1302 |
| 0010 | 1303 |
| 0011 | 1304 |
| 0100 | 1305 |
| 0101 | 1306 |
| 0110 | 1307 |
| 0111 | 1308 |
| 1000 | 1309 |
| 1001 | 1310 |
| 1010 | 1311 |
| 1011 | 1312 |
| 1100 | 1313 |
| 1101 | 1314 |
| 1110 | 1315 |
| 1111 | 1316 |

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium.

2. Description of the Related Art

Conventionally, there is machine learning technology for analyzing a new pattern with the use of learning patterns. Among them, a pattern recognition method (Leo Breiman, Jerome Friedman, Charles J. Stone, and R. A. Olshen, "Classification and Regression Trees," Chapman & Hall/CRC, 1984) (hereinafter referred to as the non-patent document) called a classification tree or decision tree has been proposed, and adopted by many systems. This method is characterized by its ability for high-speed pattern analysis utilizing a tree structure, and demonstrated its ability in an age when calculators' performance was poor. Note that, when a pattern recognition problem is considered to be a pattern identification problem, the type of pattern to be identified will be referred to as a "class," and in the following description, the term "class" will be used in this sense.

Meanwhile, a disadvantage of the classic classification tree or decision tree, which is suggested by the non-patent document, lies in the fact that recognition performance is not so good. To overcome this disadvantage, for instance, a method utilizing a group of classification trees (ensemble) as suggested by U.S. Pat. No. 6,009,199 has been proposed. In this method, L number of classification trees are created (L is a constant larger than or equal to 2, and is normally in the range of 10 to 100). With the use of all the classification trees, the method realizes higher recognition performance. This method has a disadvantage in that it requires L times as much calculation time as the conventional method utilizing one classification tree, thus sacrificing the characteristic of high-speed pattern recognition of the conventional classification tree. However, due to the recent improvement in calculators' performance, the method utilizing ensemble of classification trees has become feasible within a realistic time. Also, because of its high recognition performance, this method has recently been employed by many systems. Incidentally, although this method is slower than the algorithm of the classic classification tree, it achieves high-speed and equal-level performance of pattern recognition, compared to the pattern recognition method utilizing a support vector machine disclosed in Japanese Patent Laid-Open No. 2005-339186.

However, assuming a case of an application utilizing an image as a pattern, real-time pattern recognition is often required, and thus a higher-speed pattern recognition algorithm becomes necessary. Even in the method utilizing an ensemble of classification trees, which has been disclosed in U.S. Pat. No. 6,009,199, calculation time for recognition processing is not enough, and further improvement in speed is required.

SUMMARY OF THE INVENTION

The present invention provides an information processing technique capable of high-speed and high-precision pattern recognition.

According to one aspect of the present invention, there is provided an information processing apparatus comprising: a creation unit adapted to create a query string, which is composed of a plurality of queries; a reading unit adapted to perform reading of a query, which is corresponding to a hierarchy of a current node, from the query string; a generation unit adapted to generate a plurality of nodes having a tree structure by dividing a learning pattern set in the current node in accordance with the read query corresponding to the hierarchy; and a modifying unit adapted to modify the tree structure by putting nodes in each hierarchy together into a common node with respect to nodes up to a hierarchy corresponding to a length of the query string among the nodes having the tree structure, which have been generated by the generation unit.

According to another aspect of the present invention, there is provided an information processing apparatus comprising: a first table generation unit adapted to generate a table by dividing a learning pattern in accordance with a plurality of query strings; a second table generation unit adapted to generate a table by further diving a learning pattern group in accordance with a plurality of query strings, the learning pattern group being divided with the table generated by the first table generation unit; and a discriminator creation unit adapted to create a discriminator for discriminating a pattern by combining the table, which has been generated by the first table generation unit, with the table which has been generated by the second table generation unit.

According to the present invention, it is possible to provide an information processing technique capable of high-speed and high-precision pattern recognition.

Furthermore, it is possible to reduce a memory or disk capacity which is necessary for information processing in pattern recognition.

Further features of the present invention will become apparent from the following description of exemplary embodiments with reference to the attached drawings.

BRIEF DESCRIPTION OF THE DRAWINGS

FIGS. 1A and 1B are flowcharts describing a learning process according to the first embodiment;

FIG. 10A is an exemplary view of a tree which serves as an original;

FIG. 10B is an exemplary view of a combination table created based on the tree;

FIG. 14 is a table showing a corresponding relation between binary indications of splits in a query, and entity numbers;

DESCRIPTION OF THE EMBODIMENTS

First Embodiment

Figure 2A:
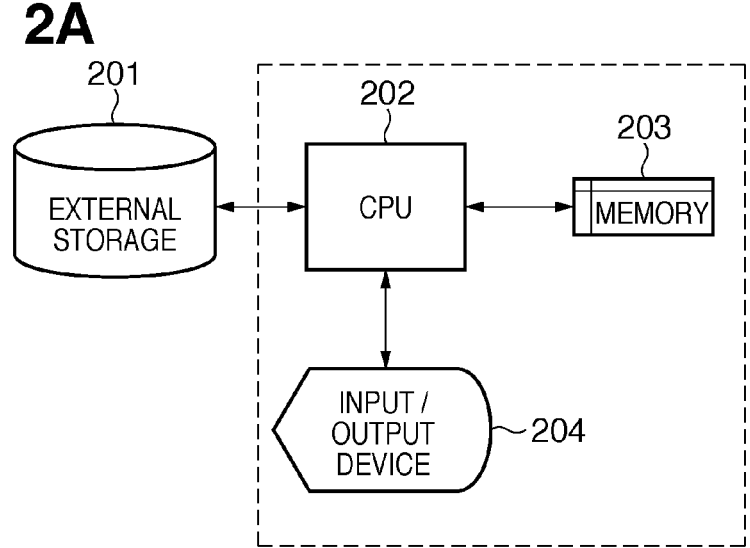
FIG. 2A is an explanatory view describing a schematic configuration of an information processing apparatus according to an embodiment of the present invention.
Figure 2B:
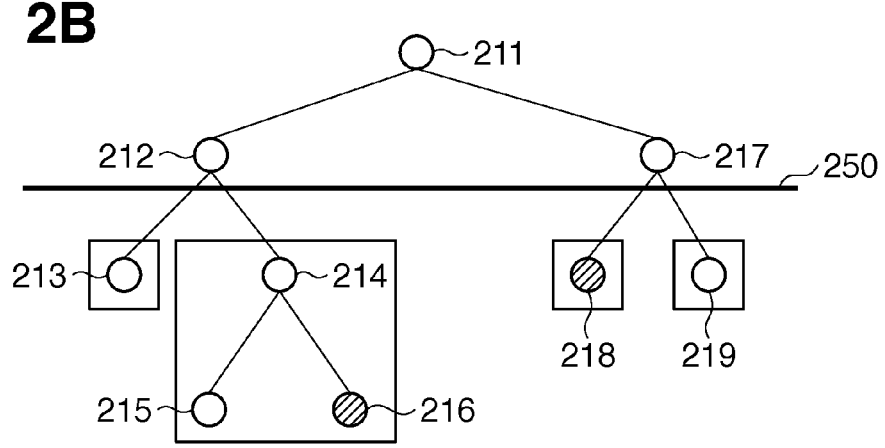
FIG. 2B is an explanatory view showing an exemplary discriminator of a tree structure.
Figure 2C:
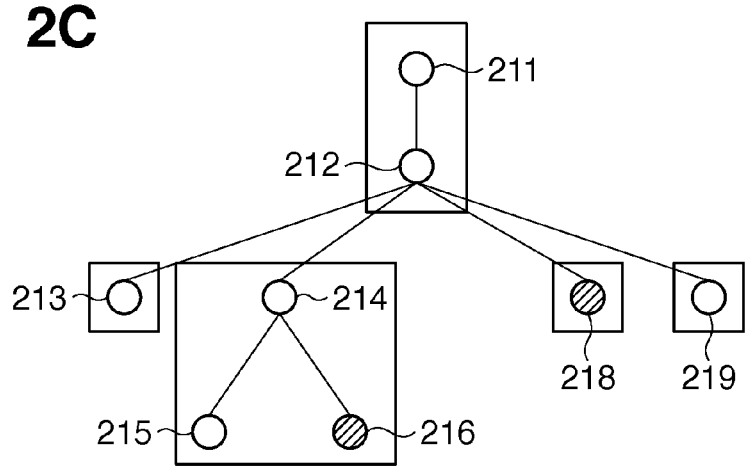
FIG. 2C is an explanatory view showing an exemplary discriminator of a tree structure.

With reference to FIGS. 2A to 2C, a schematic configuration of an information processing apparatus according to an embodiment of the present invention is described. The information processing apparatus comprises a central processing unit (CPU) 202, a memory 203, and an input/output device 204. The CPU 202 can perform data transmission or reception between the information processing apparatus and an external storage device 201 through an interface (not shown). The external storage device 201 can store a program for having a computer execute the pattern recognition method according to the embodiment of the present invention, learning patterns, and a dictionary or the like generated based on the learning patterns. Also, the external storage device 201 can store a recognition result of a new pattern which is newly obtained. The CPU 202 controls execution of a program for the pattern recognition method, and performs overall control of the information processing apparatus. The memory 203 serves as a work area for temporarily storing a program used by the CPU 202, subroutines, and data. The memory 203 can also store a recognition result of a new pattern obtained by an embodiment of the present invention.

The input/output device 204 not only performs new pattern capturing and data input/output, but also serves as an interface between a user and the information processing apparatus for receiving user instructions, displaying data for a user, and so on. For instance, if a two-dimensional image is to be used as a pattern, the input/output device 204 functions as a camera for performing image sensing of a target object. Also, the input/output device 204 can output a pattern recognition result to another information processing apparatus. Moreover, a user may output, through the input/output device 204, an execution trigger of a program which realizes the pattern recognition method according to the present embodiment. Further, through the input/output device 204, a user can view a pattern recognition result or perform parameter setting of a program.

A pattern recognition method using machine learning includes two processes: a learning process of learning many patterns, and a recognition process of analyzing a new pattern. Hereinafter, a learning process flow will be described with reference to FIGS. 1A and 1B, and a recognition process flow will be described with reference to FIGS. 3A and 3B.

The learning process is divided into two routines shown in FIGS. 1A and 1B. The routine in FIG. 1B is recursively called. By executing the flowcharts in FIGS. 1A and 1B, a group of learning patterns is recursively divided. Obtained as a result is a tree-structure dictionary (a discriminator having a tree structure) shown in FIGS. 2B and 2C. In other words, creating a tree-structure dictionary, namely, a tree-structure discriminator, is logically equivalent to recursively dividing a group of learning patterns.

First, in step S101, a query string is created. A query herein means a "question" that decides the branch, into which a pattern is to be split. For instance, a question such as "is the i-th dimensional value larger than or equal to a threshold, or is it less than the threshold?" may branch a pattern into right and left branches. In a case where a pattern is image data, splitting may be performed by, for instance, "comparing a value (luminance) at a position with a value (luminance) at a position, and asking which value is larger." Generally, branches do not have to be two; and there may be N branches. For an example of a query in this case, splitting may be performed in accordance with "a quotient obtained by dividing the i-th dimensional value by a constant."

As an example of a query, hereinafter, assume a query which selects a certain dimension of multi-dimensional data and judges whether a value in the certain dimension is larger than or equal to a threshold, or whether it is less than the threshold. By selecting the target dimension from all dimensions at random and selecting the threshold from a certain section at random, a random query string can be obtained. In step S101, for instance, such query string is created. Note that the number of queries (the length of a query string) to be created is set in advance. Assume that the number is T (length of a query string) in the following description.

In step S102, all learning patterns are stored (set) in the root node. In step S103, the root node is set as a current node. Herein, a "root node" indicates a node which exists at the root of a tree. Node 211 in FIG. 2B corresponds to the root node. A "current node" indicates a node which is currently being processed in a learning process or a recognition process. In step S104, the processing calls the subroutine for developing the current node, which is described in FIG. 1B, and when the processing returns from the subroutine, the learning process ends. Note that the current node moves in numerical order from node 211 to 219 in FIGS. 2B and 2C.

With reference to FIG. 1B, the flow of subroutine processing for developing a node is now described. In step S105, it is determined if the current node is a null node or a leaf node (the definition of the null node and leaf node will be described later). When the current node is a null node or a leaf node (YES in S105), the subroutine in FIG. 1B ends.

If the current node includes no learning patterns, the node is regarded as a null node. If a group of learning patterns that remain in the current node satisfies a certain condition, the node is regarded as a leaf node. The certain condition is, for instance, "the class in which the current node exists is smaller than or equal to K types (e.g., K=10)." In a case where K=1 is set in this condition, the condition defines that "the current node includes purely one class." Alternatively, an information on an amount of entropy may be calculated based on the learning patterns that exist in the current node, and the condition may be set in a way that the entropy value is smaller than or equal to a threshold. Assuming that the threshold is 0 in this condition, the condition is the same as the aforementioned condition, that is, "the current node includes purely one class."

In the example shown in FIGS. 2B and 2C, nodes 213, 215 and 219 are leaf nodes, and nodes 216 and 218 are null nodes. When the nodes 213, 215, 216, 218 and 219 are set as the current node, determination in step S105 becomes YES, and the processing in FIG. 1B ends. The null node and leaf node are called a terminal node, and information of the remaining learning patterns are stored. For instance, in a case where the purpose of pattern recognition is class determination, existence probability of each class is stored in the terminal node. Note that, as mentioned above, if the leaf node condition defines that "the current node includes purely one class," the remaining class number may be stored as information. Meanwhile, in a case where the purpose of pattern recognition is a so-called recursion, an estimate value or estimate vector is stored in the terminal node.

When NO in step S105, the subroutine processing continues from step S106 for developing the current node. Current node developing is executed by steps S106 to S113. In the processing of step S112, the subroutine of FIG. 1B is recursively called. As a result of this processing, a group of learning patterns is recursively divided.

In step S106, prior to the current node developing, a query is read from the query string, which has been created in step S101, in accordance with the depth (hierarchy) of the current node. For instance, in FIG. 2B, the root node (node 211) is the current node. Since the depth of the root node is 0, the 0-th query is read from the query string.

In step S107, it is determined whether or not the query has successfully been read. When it is determined that reading has successfully been performed (YES in S107), the processing proceeds to step S109. If it is determined that reading has not successfully been performed (NO in S107), the processing proceeds to step S108.

The determination of successful query reading in step S107 is made, in a case where the depth of the current node is less than the length of the query string created in step S101 and there is a query to be read. For instance, in the nodes 212 and 217 having the same depth, the same query is read.

The determination of unsuccessful query reading in step S107 is made, in a case where the depth of the current node is larger than or equal to the length of the query string created in step S101 and there is no query to be read. More specifically, if the depth of the current node is larger than or equal to the length (T) of the query string, the determination result in step S107 becomes NO, and the processing proceeds to step S108.

In step S108, processing for unsuccessful query reading is executed. More specifically, processing for creating a new query based on a group of current patterns is executed. In the example in FIG. 2B, the length T of the query string is T=2. Since the depth of the current nodes 212 and 217 is 1, it is determined in step S107 that the query reading has been performed successfully (YES in S107).

On the contrary, in a case of the node 214, since the depth of the node 214 is 2, query reading fails. In this stage, processing of step S108 is executed for creating a new query. The processing in step S108 is effective when, for instance, a query needs to be selected appropriately for each node. For a method of query selection, a method utilizing mutual information amount which is based on the information amount entropy, or a method utilizing Gini coefficient as disclosed in the non-patent document 1 may be used. Further, in the processing in step S108, it is not necessary to select the most appropriate query, but a query may be selected at random as described in step S101.

In step S109, the remaining learning patterns (a group of current patterns) in the current node are divided based on the query which has been set by reading. In general, the number of division N may be different for each current node, but normally the same value is used in all nodes. For instance, in a case of N=2, a so-called binary tree is created, and a classification tree (divided branches) having a form shown in FIG. 2B is obtained. The processing of steps S110 to S113 is a loop executed for each divided branch. In a case where the number of divided branches is N, the processing is repeated in N times of loop. In step S111, a divided branch i is set as a current node. In step S112, the subroutine in FIG. 1B is recursively executed.

FIG. 2B shows an example of a created classification tree. The part above the thick horizontal line 250 is a table part, and the part boxed by the square below the horizontal line 250 is a tree part. Nodes 211, 212 and 217 are the table part, and other nodes are the tree part. Herein, the nodes are separated by the terms "table" and "tree" and clearly discriminated. In the generation (creation) process in the flowchart, processing for the "table" part is executed in order of steps S107 and S109 in FIG. 1B, while processing for the "tree" part is executed in order of steps S107, S108 and S109 in FIG. 1B. Normally, a tree is structured by nodes 214, 215 and 216; however, the nodes 213, 218 and 219 have a special tree form, in which the root node is a null node or leaf node.

Assuming that the length (also called a depth (hierarchy)) of the table is P and the number of each split is R, each element (entity) of the table is $R^P$. In the case of FIG. 2B, the depth P is 2 and the split R is 2; therefore, there are 4 (=$2^2$) entities, and each entity stores a tree boxed by the square. Since the nodes 212 and 217 in FIG. 2B have the same query, they can be viewed as the same. This is summarized and shown in FIG. 2C. Among the nodes in the tree structure, with regard to the node up to the hierarchy corresponding to the length of the query string, nodes of each hierarchy are made into a common node, and the tree structure is changed. In FIG. 2C, the node 212 is shown as a common node of 212 and 217. When a query is inputted, there are R ways of possibilities (=number of splits). The possibilities are represented by branches in FIG. 2B, while in FIG. 2C they are not explicitly represented by branches. The representation in FIG. 2C clarifies the table part and the tree part. In accordance with results of P number of query strings, there are $R^P$ number of splits (=entities in the table). Before a recognition process, a query constituting a query string is read, and pattern recognition is executed using the read query and the changed tree structure.

Figure 3A:
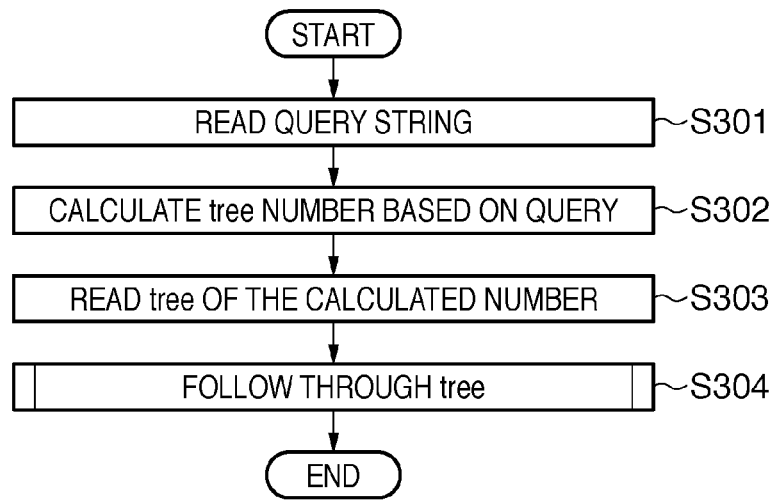
FIGS. 3A and 3B are flowcharts describing a recognition process.
Figure 3B:
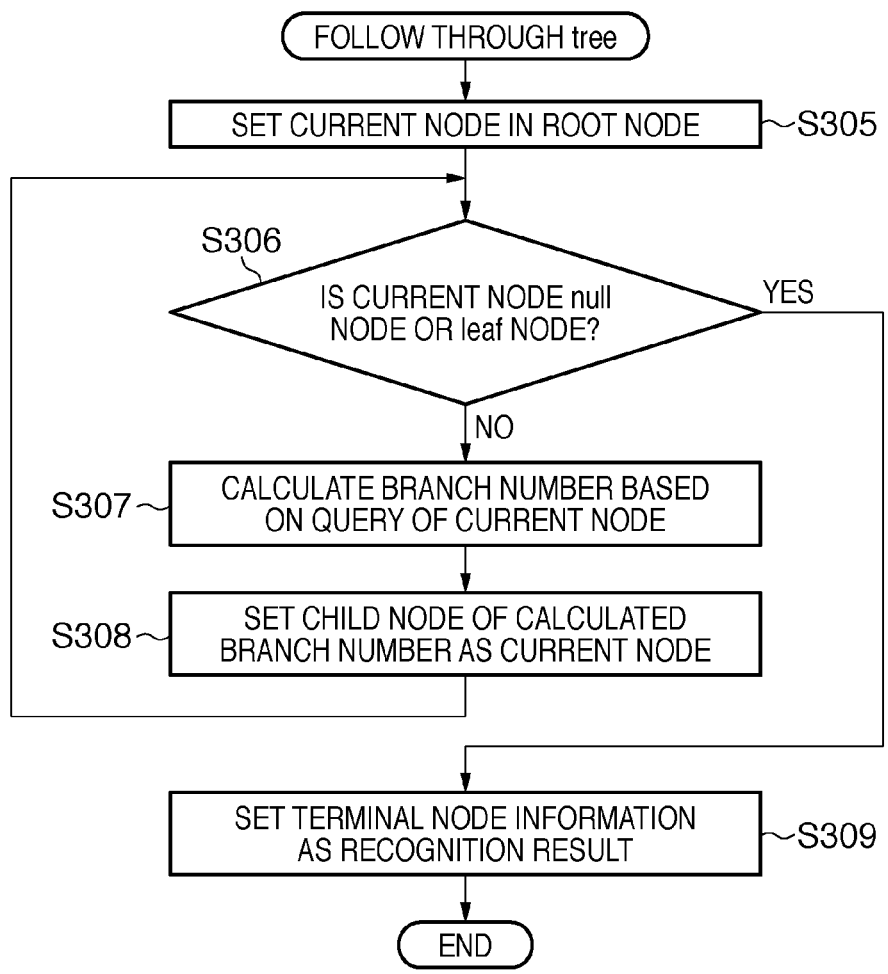

Described with reference to FIGS. 3A and 3B is a recognition process of a new unknown pattern using a dictionary having the tree structure created in FIGS. 1A and 1B. First, in step S301, a query constituting a query string is read. In the case of FIG. 2B, two queries are read. In the pattern recognition according to the embodiment of the present invention, since a query is uniquely designated in accordance with the depth of the query string, advance query reading is possible. Owing to the recent advancement in CPUs, advance query reading can lead to the use of a collective query processing technique, such as Single Instruction/Multiple Data (SIMD). As a result, the pattern recognition method according to the present embodiment can realize extremely high-speed calculation processing. Next, in step S302, a tree number is calculated based on the query constituting the query string, which has been read in step S301. In the case of the tree in FIG. 2B, the tree numbers include 0 to 3. In each sub-tree, the root nodes are node 213 (tree number 0), node 214 (tree number 1), node 218 (tree number 2), and node 219 (tree number 3). Then, the tree having a calculated number is read (S303), and the tree is followed through (S304). The subroutine for following through the tree is shown in FIG. 3B. In step S305, the current node is set in the root node. Next, it is determined whether or not the current node is a terminal node (null node or leaf node). If the current node is a terminal node (YES in S306), the terminal node information is set in the recognition result (S309), and the subroutine ends.

If the current node is not a terminal node (NO in S306), a branch number is calculated based on the query stored in the current node (S307). Then, a child node of the calculated branch number is set as a current node (S308). Next, the processing returns to step S306 for repeating the similar processing.

In the subroutine shown in FIG. 3B, the tree is followed through from the root node until a null node or leaf node is reached. An implementation example of the discriminator having the tree structure of the recognition process (flowchart in FIGS. 3A and 3B) is shown in 710 and 711 in FIG. 7B. As in 710 in FIG. 7B, a query string consisting of P number of queries is first read (S301 in FIG. 3A). Based on the query, a tree number is calculated (S302 in FIG. 3A). Then, a discriminator having the calculated tree number is read from the $R^P$ number of discriminators (table 711 in FIG. 7B) (S303 in FIG. 3A). With the use of the discriminator, a new pattern is analyzed (S304 in FIG. 3A).

According to the present embodiment, it is possible to provide an information processing technique capable of high-speed and high-precision pattern recognition. Furthermore, it is possible to reduce a memory or disk capacity which is necessary for information processing in pattern recognition.

Second Embodiment

Figure 4A:
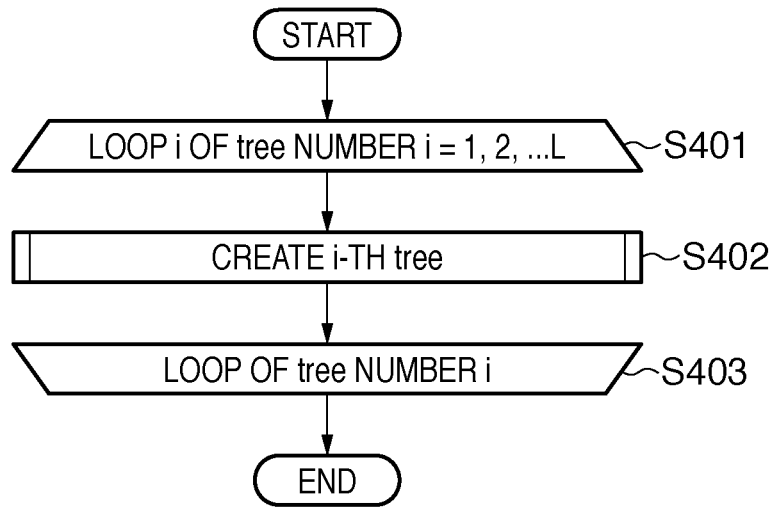
FIG. 4A is a flowchart describing a learning process according to the second embodiment.
Figure 4B:
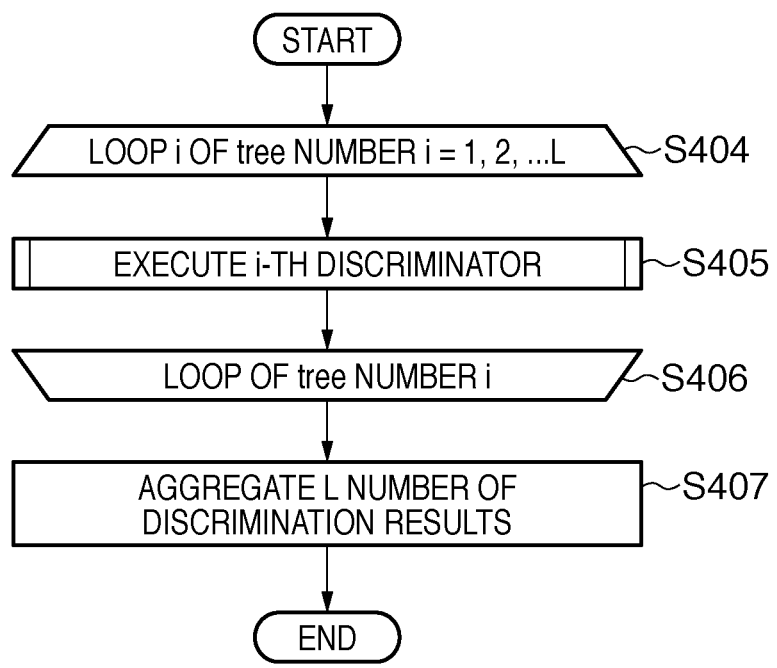
FIG. 4B is a flowchart describing a recognition process according to the second embodiment.

Next, a learning process flow according to the second embodiment will be described with reference to FIG. 4A, and a recognition process flow according to the second embodiment will be described with reference to FIG. 4B. The first embodiment has described a method of creating a discriminator having one tree structure, and a method of analyzing a pattern using the discriminator having one tree structure. The second embodiment will describe a method of creating a discriminator having a plurality of tree structures, and a method of analyzing a pattern using the discriminator having a plurality of tree structures. Assume that there are L number of discriminators having tree structures. Normally, L is set around 10 to 100, and is two or more arbitrary constants. When the number of discriminators L is large, the dictionary size is enlarged, thus the recognition rate improves. Contrary, when the number of discriminators L is small, the dictionary becomes compact, thus the recognition rate declines.

By repeating steps S401 to S403 from tree numbers 1 to L, processing of the learning process is executed. In the loop of the learning process, the learning process in FIG. 1B is called as a subroutine (S402). In the processing loop of the learning process, the subroutine call in S402 can be performed independent of the overall processing. In other words, the processing loop of the learning process in steps S401 to S403 may be performed simply by multi-thread or multi-task. It is also possible to easily execute the processing in parallel by using a plurality of calculators. The method of creating a discriminator having a plurality (L numbers) of tree structures shown in FIG. 4A is suited for parallel computation. As the parallelism is increased, calculation can be performed at extremely high speed. In the recognition process in FIG. 4B, after the loop (S404 to S406) is performed for the discriminator (tree) number 1 to L, final results of the L number of discriminators are aggregated in step S407. In the loop processing of the recognition process, the learning process using a tree structure in FIG. 4A is called as a subroutine (S405).

In step S407, recognition results of the L number of discriminators are aggregated to obtain a final pattern recognition result. For an aggregating method, for instance, assuming that a pattern recognition task is a class discrimination task, a result of discriminator is an existence probability vector of each class. For aggregating the recognition results in step S407, an arithmetic mean or geometric mean of the L number of existence probability vectors may be obtained. The recognition process in FIG. 4B is also suited for parallel processing as similar to the learning process in FIG. 4A, and can realize extremely high-speed processing if the parallelism is increased.

Third Embodiment

In the third embodiment, the discriminators having a tree structure described in the first embodiment are all made into a table. For this, it is necessary to have a sufficiently long length T of the query string in step S101 in FIG. 1A. In the description of the first embodiment, T=2 is given as an example of the length of a query string. In the present embodiment, T=100 can be set. The tree structure obtained as a learning result in FIG. 2B is generated under the condition of T=2. However, nodes in the third hierarchy (assuming that the root node is the first hierarchy), except node 214, are all (three) terminal nodes. Therefore, even if T is set to, for instance, 3 or larger, a tree structure having a form shown in FIG. 2B will be generated. Hereinafter, descriptions are provided assuming that a sufficiently large value T is set in FIG. 2B and that the tree structure is constructed in accordance with the flowcharts in FIGS. 1A and 1B.

FIGS. 5A to 5D show examples of table forming of the entire FIG. 2B. Although FIGS. 5A to 5D have a tree form for convenience of display, since nodes of the same hierarchy (depth) have the same query, they are practically tables. Since there are 3 hierarchies and 2 splits, the number of entities in the table is 8 (=$2^3$).

Numbers written under the end nodes indicate node numbers shown in FIGS. 2B and 2C, and the same information is stored. Nodes indicated by hatched lines are null nodes. Herein, information stored in each node includes, as described in the first embodiment, an existence probability vector of each class, an estimate value for recursion, or the like. As a form of implementation, it is efficient if each node has a pointer to the information stored in the end node (=entity of the table).

Figure 5A:
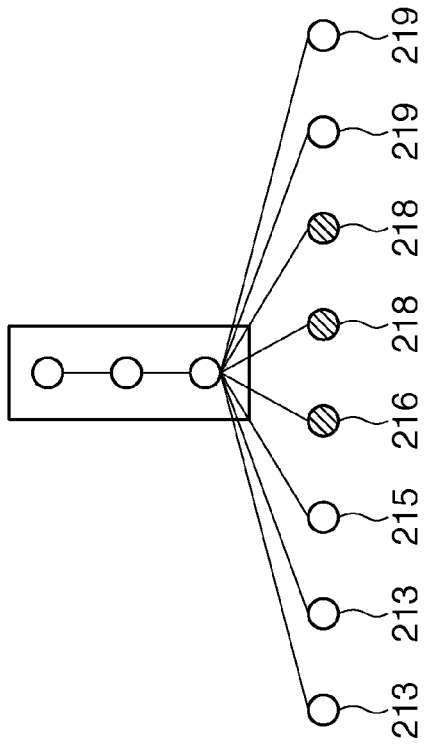
FIGS. 5A to 5D are explanatory views showing exemplary table forming.
Figure 5B:
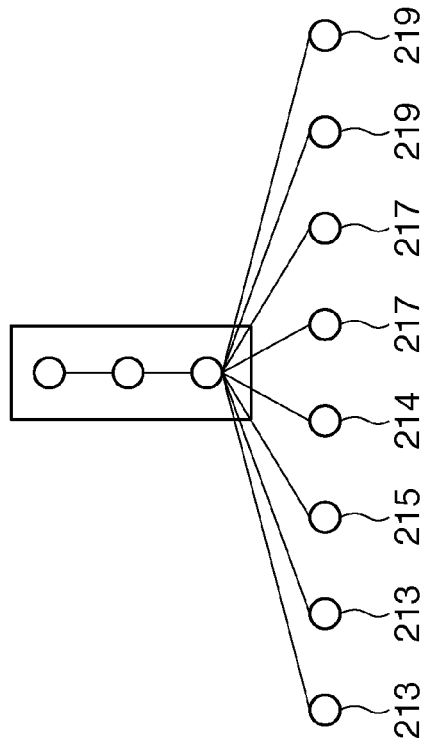
Figure 5C:
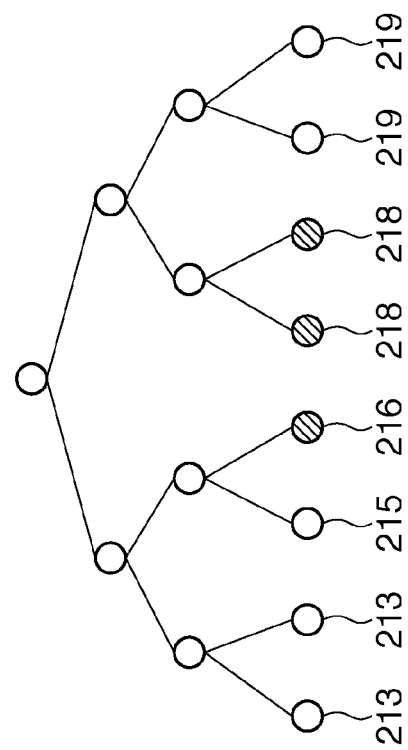
Figure 5D:
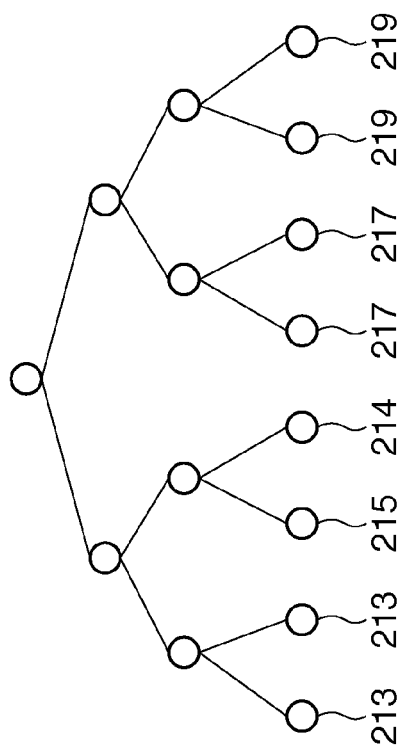

FIG. 5A shows an example of table forming of the entire FIG. 2B. FIG. 5B shows an example of table forming wherein the null-node part in FIG. 2B is replaced with parent nodes. The important point in FIGS. 5A to 5D is in that they have end nodes (=entities of the table) storing the same information. In other words, the table generated in the present embodiment stores redundant information. Although it results in necessitation of a large disk capacity or memory capacity in the present embodiment, it achieves an effect of extremely high-speed recognition. FIGS. 5C and 5D show tables of FIGS. 5A and 5B in a more easy-to-understand manner. It is exactly the same relation as that of FIGS. 2B and 2C. In FIGS. 5C and 5D, a query having the same content is displayed as one query. While FIG. 5C corresponds to FIG. 5A, FIG. 5D corresponds to FIG. 5B. Assuming that the length (also called a depth) of the table is P and the number of node division (number of splits) is R, each element (entity) of the table is $R^P$. In the case of FIGS. 5A to 5D, the depth P is 3 and the split R is 2; therefore, there are 8 (=$2^3$) entities. In a recognition process, since a final entity can be calculated by simply reading three queries, extremely high-speed processing is realized.

Figure 6A:
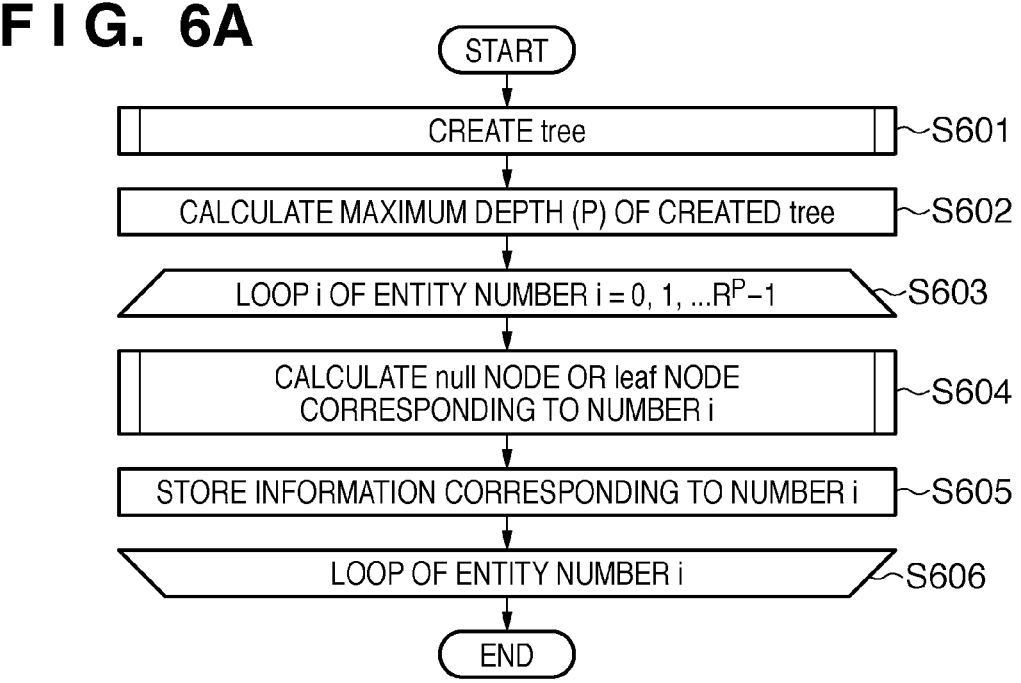
FIGS. 6A and 6B are flowcharts describing steps of table creation.
Figure 6B:
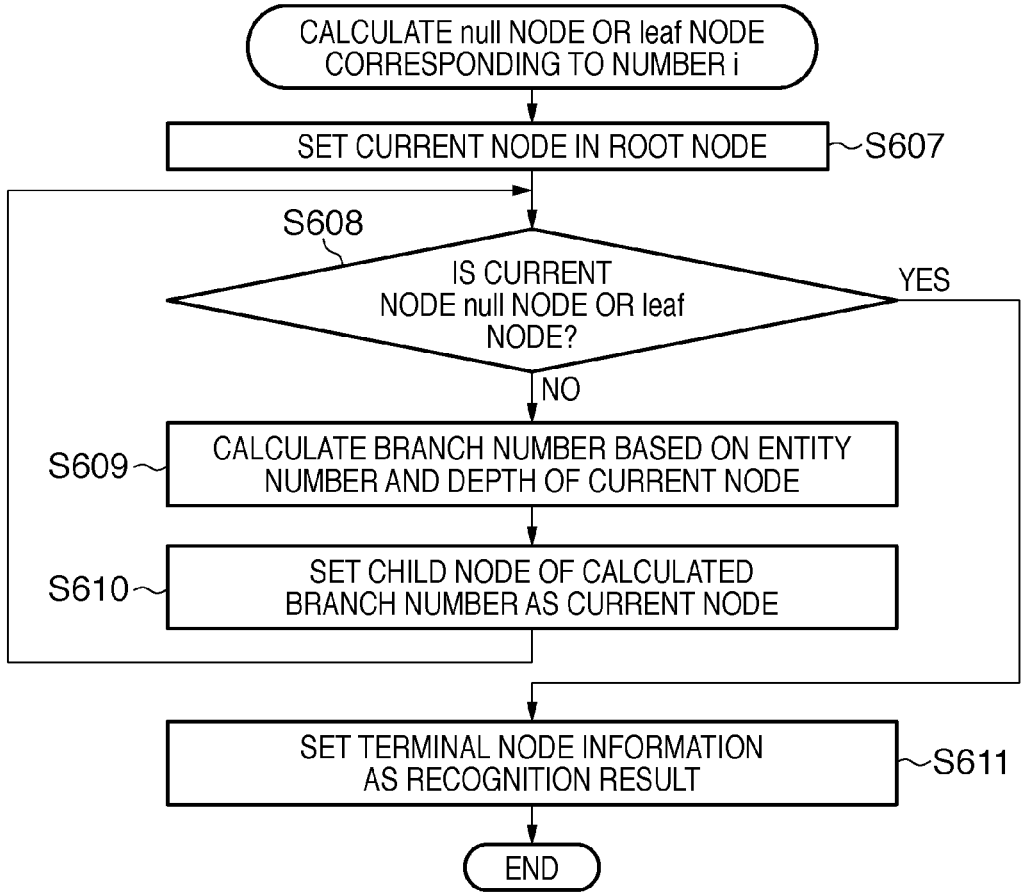

With reference to FIGS. 6A and 6B, a table creation procedure of FIG. 5A to 5D is described. In step S601, the flowcharts in FIGS. 1A and 1B are called as a subroutine, thereby creating a tree. In this stage, as mentioned above, a query string of step S101 having a sufficiently long length is prepared. In step S602, the maximum depth (P) of the tree, created in step S601, is calculated. In the case of the tree structure in FIG. 2B, the maximum depth (P) is 3.

Then, steps S603 to S606 are executed as loop processing of entity number i. Assuming that the number of splits is R, the entity number i ranges from 0 to $R^P-1$. Herein, the entity number i starts from 0 for the sake of easy explanation. Even if the entity number i ranges from 1 to $R^P$, the process is substantially the same. In step S604, a terminal node (null node or leaf node) corresponding to the entity number i is calculated. In the processing of step S604, the subroutine in FIG. 1B is called.

When the processing returns from the subroutine of FIG. 1B, information corresponding to the calculated terminal node (null node or leaf node) is stored in the entity (S605).

Steps S607, S608, S610 and S611 in FIG. 6B are respectively the same processing as that of steps S305, S306, S308 and S309 in FIG. 3B. Only the processing of step S609 is different from the subroutine in FIG. 3B. This processing calculates a branch number based on the entity number. For ease of explanation, assuming that an entity number i is a base-R number, i is a number having P digits. Also, assuming that the depth of the current node is d, the number in the d-th digit of i is the branch number.

The results of loop execution in steps S603 to S606 in FIG. 6A are the numbers shown in FIGS. 5A to 5D. In FIG. 5A, eight nodes 213, 213, 215, 216, 218, 218, 219 and 219 shown in FIG. 2B are obtained. In FIG. 5B, eight nodes 213, 213, 215, 214, 217, 217, 219 and 219 shown in FIG. 2B are obtained.

Figure 7A:
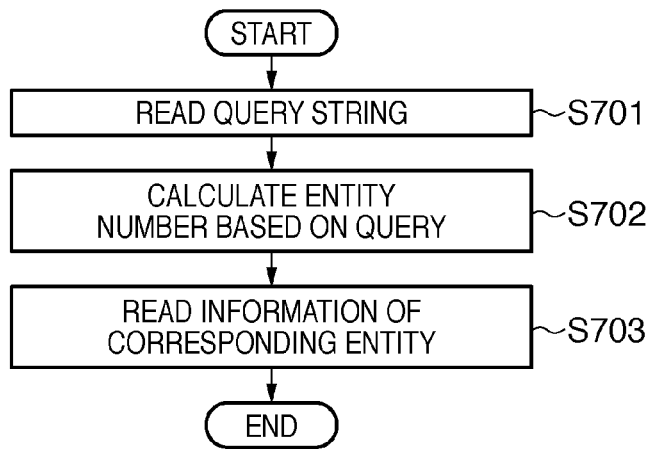
FIGS. 7A and 7B are exemplary views of incorporating the discriminator of a tree structure.
Figure 7B:
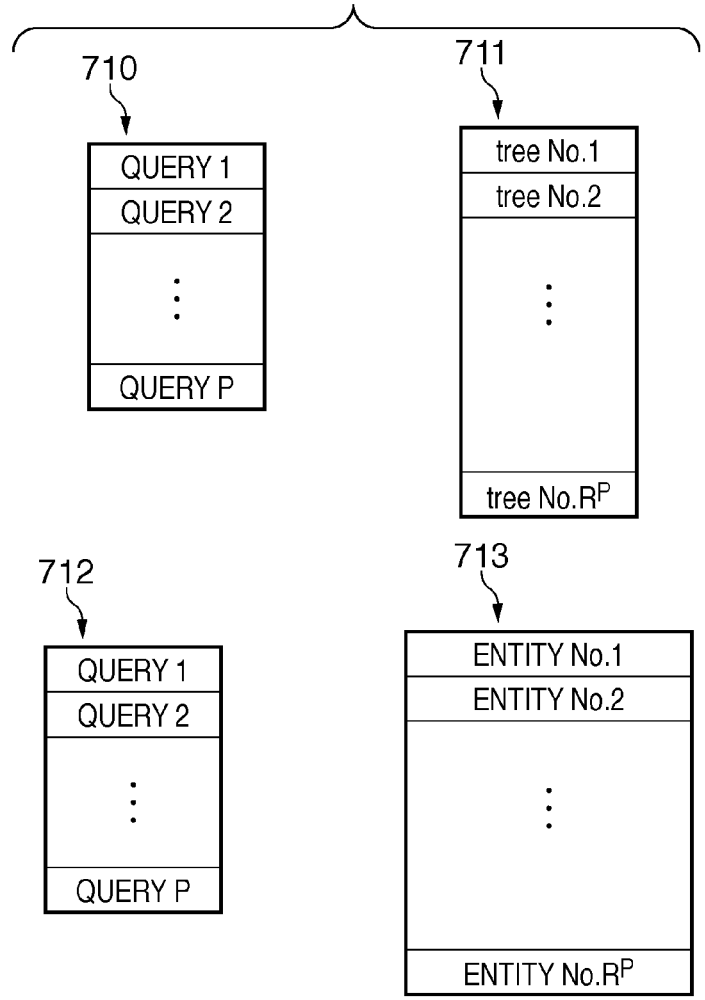

Next, the recognition process according to the present embodiment is described with reference to FIGS. 7A and 7B. First, a query string composed of P number of queries as indicated by numeral 712 in FIG. 7B is read (S701 in FIG. 7A). Based on the query, an entity number is calculated (S702 in FIG. 7A). As a result, entity information of the number, which is calculated from $R^P$ number of entities (713 in FIG. 7B), is read (S703 in FIG. 7A).

According to the present embodiment, it is possible to provide an information processing technique capable of high-speed and high-precision pattern recognition. Furthermore, it is possible to reduce a memory or disk capacity which is necessary for information processing in pattern recognition.

Fourth Embodiment

Figure 8A:
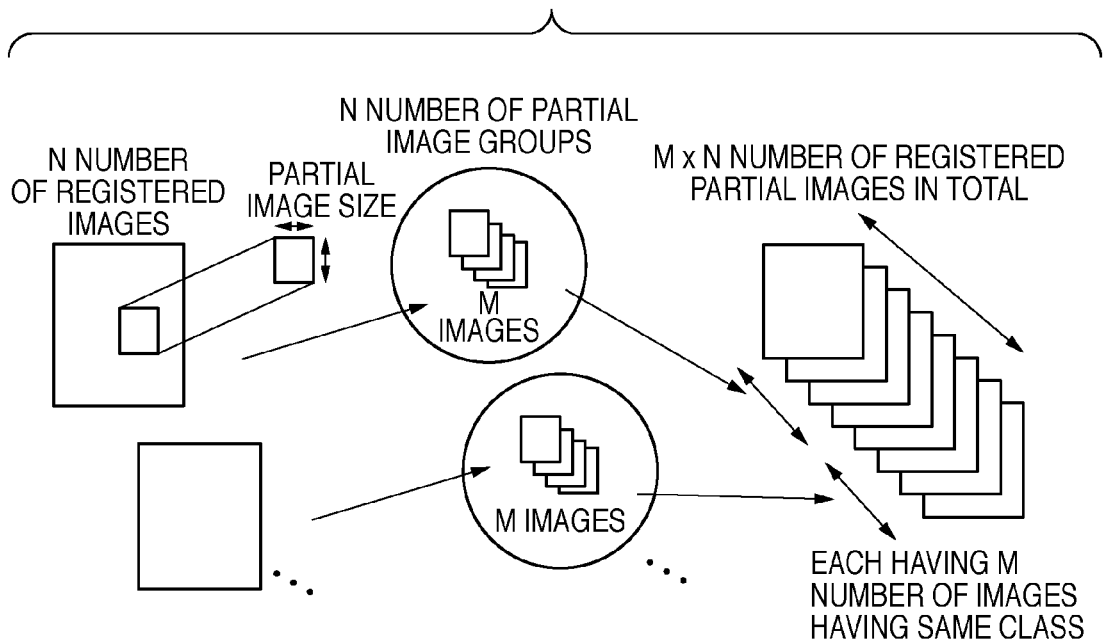
FIGS. 8A and 8B are explanatory views describing a case where an image is used as a pattern.
Figure 8B:
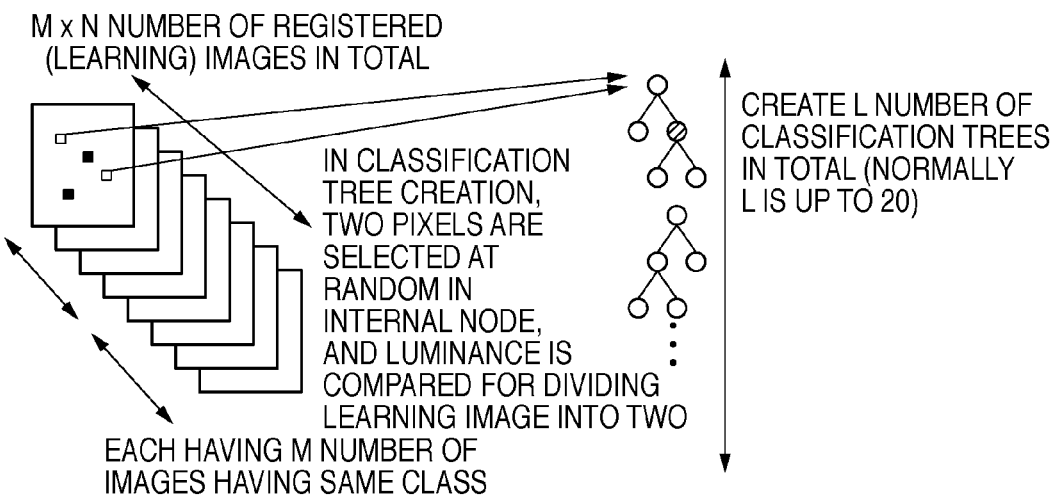

With reference to FIGS. 8A and 8B, a case where an image is used as a pattern is described. In the present embodiment, M number of partial images are extracted from a learning image. This is called a partial image group. The partial images, which constitute the partial image group, do not have to overlap with one another, but partial images can be exhaustively extracted from the learning image so as to have overlaps.

For instance, assume that the learning image size is 100×100 pixels, and a partial image size is 50×50 pixels. Disregarding positions in-between pixels (so-called sub-pixels), there are 2601 partial images (=51×51) extracted from one learning image. If partial images having no overlaps are extracted, 2×2=4 partial images are obtained. The partial image group shown in FIG. 8A can consist of as many partial images as possible from the 2601 partial images. For a final learning partial image group, M number of learning partial images having the same class are obtained, and in total, M×N number of learning partial images are obtained. With the use of the learning partial image group, a binary tree is created (FIG. 8B).

Since there are L number of classification trees, the classification tree creation is performed L times. In classification tree creation, two pixels are selected at random in the node of each classification tree. By comparing luminance of the pixels, the group of learning partial images is recursively divided. Note that, although two pixels are selected at random in the present embodiment, two arbitrary rectangular areas in a partial image may be selected at random, and average luminance of the rectangular area may be compared for branching.

Figure 9A:
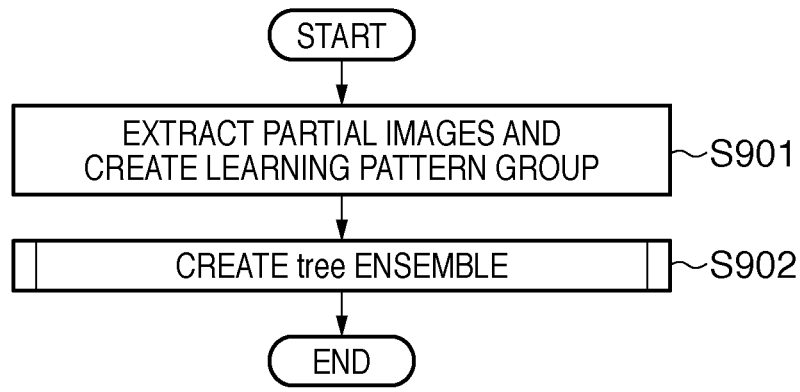
FIG. 9A is a flowchart describing a learning process according to the fourth embodiment.

Instead of rectangles, a plurality of mask patterns prepared in advance may be used. In this case, two mask patterns having an arbitrary type, which are located in an arbitrary position of a partial image, are selected at random. By comparing average luminance of the area, the group is recursively divided. FIG. 9A shows a flowchart of this learning process.

In step S901, partial images are extracted to create a learning pattern group. This processing corresponds to the processing which has been described with reference to FIG. 8A. In step S902, a tree ensemble is created. This processing corresponds to the processing which has been described with reference to FIG. 8B. More specifically, the processing in FIG. 4A is called as a subroutine. In the diagram in FIGS. 8A and 8B, it is assumed that M number of partial images which are extracted from one learning (registered) image are viewed as the same image, and that the number of classes in the learning process is N. On the other hand, M number of partial images may be discriminated by using an offset position of the learning image, and M×N (types) classes in total may be acquired.

Figure 9B:
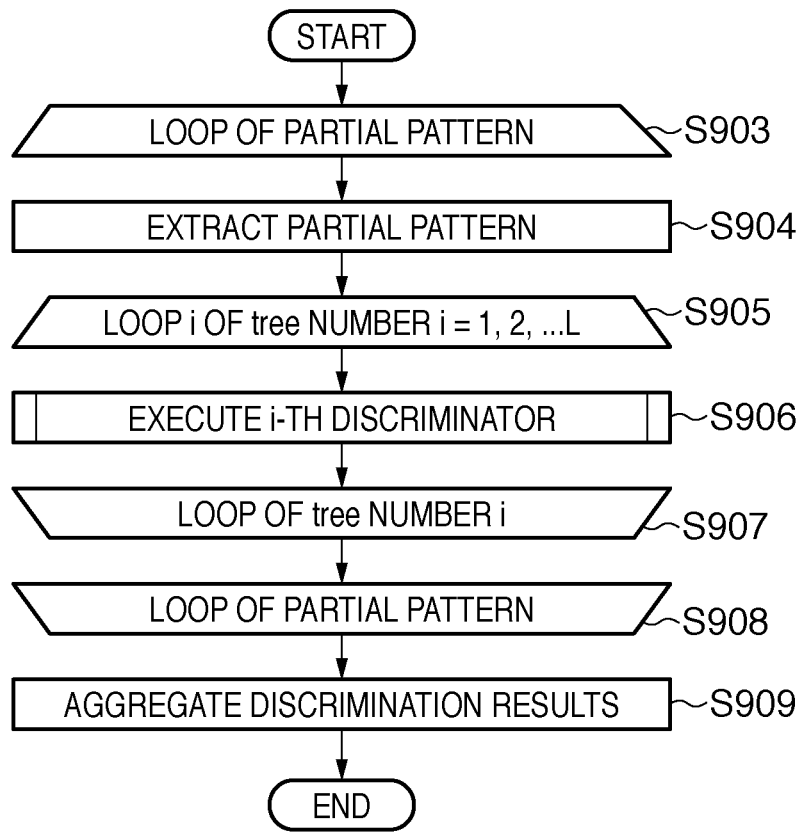
FIG. 9B is a flowchart describing a recognition process according to the fourth embodiment.

Next, a processing flow of the recognition process according to the present embodiment is described with reference to FIG. 9B. For example, assume that a new input image size is 1280×1024, and a partial image size is 50×50. Disregarding sub-pixels, the new input image has 1200225 (1231×975) partial images (X=1280−50+1, Y=1024−50+1). Basically, the processing from step S903 to S908 is a loop repeated 1200225 times. However, it is not always necessary to repeat execution 1200225 times, but steps may be skipped along the way for high-speed processing.

In the partial image loop, the loop of the tree number is executed (S905 to S907). In this processing, double loops are executed. Since two loops are independent from each other, the inner loop and the outer loop may be switched. In step S906 which is the deepest processing of the loop, the i-th discriminator is executed. In this processing step, the flowcharts in FIGS. 3A and 3B are called as a subroutine. Last, in step S909, discrimination results are aggregated. As a result, learning images having the size of 100×100, which exist in the input image having the size of 1280×1024 size, are extracted. For an aggregating method, an arithmetic mean or geometric mean of existence probability vectors of each class may be obtained. Furthermore, with the use of the offset in which positions are recorded in the learning image of the aforementioned partial images, existing positions of the learning image can be obtained.

According to the present embodiment, it is possible to provide an information processing technique capable of high-speed and high-precision pattern recognition. Furthermore, it is possible to reduce a disk or memory capacity which is necessary for information processing in pattern recognition.

Fifth Embodiment

The first embodiment realizes high-speed and high-precision pattern recognition by virtue of combining a table and a tree. The third embodiment realizes high-speed and high-precision pattern recognition by using one large table. If the first embodiment is compared with the third embodiment, the first embodiment has an advantage in that a more compact dictionary can be created at the expense of speed. On the contrary, the third embodiment has an advantage of realizing a discriminator of higher speed compared to the first embodiment, at the expense of compact feature. By combining a plurality of tables generated in different table generation processes, the present embodiment provides a configuration for generating a discriminator having the advantages of the first and third embodiments.

FIG. 10A is an exemplary view of a tree which serves as an original, and FIG. 10B is an exemplary view of a combination table created based on the tree. Numerals 1011 to 1023 in FIG. 10A indicate nodes constituting the tree. Note that the tree in FIG. 10A is one step deeper than the tree in FIG. 2B. Similar to FIG. 2B, among the end nodes, nodes indicated by white circles are leaf nodes, and nodes indicated by hatched lines are null nodes. Nodes which are not end nodes, in other words, nodes having a branch indicate internal nodes. In accordance with the query in the node, the node splits to each branch.

In the fifth and sixth embodiments, for ease of explanation, assume that one leaf node stores one learning pattern. A learning pattern stored in, for instance, the leaf node 1013 is expressed as "P1013" with the prefix of the letter P. In this condition, four learning patterns P1013, P1016, P1017 and P1023 are after all prepared as learning data at the time of tree creation shown in FIG. 10A. Note that, generally, a learning pattern stored in one leaf node is not limited to one, as mentioned in the first embodiment, and a plurality of learning pattern information can be stored.

The tree creation method shown in FIG. 10A is the same as the method described in the third embodiment. More specifically, a large number of queries are generated in advance, and based on the queries, a tree is created. As a result, all nodes in a tree having the same depth have a common query. More specifically, the nodes 1012 and 1019 use the same query. Similarly, the nodes 1014 and 1021 use the same query.

The thick line 1050 indicates a boundary between nodes for initial table forming, as similar to the thick line 250 in FIG. 2B. First, at the boundary indicated by the thick line 1050, a table having two steps of queries is created. As a result, a table 1100 indicated by a square 1100, which encloses the nodes 1011 and 1012 in FIG. 10B, is created. The table 1100 is referred to as a root table. Note that the position of the thick line 1050, in other words, the second step from the root node 1011, is arbitrary. A position which is efficient for dictionary forming may be decided by a user in advance, or the most efficient number of steps may be calculated.

In the first embodiment (FIG. 2B), the end of the root table is connected to four trees. On the contrary, in the present embodiment, the root table 1100 is connected to four tables 1101 to 1104 indicated by squares. Note that the table 1101 consists of leaf node 1013 in which no query exists, and the table 1103 consists of null node 1020 in which no query exists. Normally, a table having no query is not called a table. However, in order for easy understanding of the present embodiment, tables in which no query exists, such as tables 1101 and 1103, are referred to as a table having 0 step for descriptive purpose. This corresponds to the tree consisting only of a terminal node being called a tree in the first embodiment. Further, according to the same rule of terming, the table 1102 in FIG. 10B is referred to as a table having two steps of queries, and the table 1104 is referred to as a table having one step of query. A boundary of a query in creation of the table 1102 is the thick line 1051 in FIG. 10A, and a boundary of a query in creation of the table 1104 is the thick line 1052. Note that the positions of the thick lines 1051 and 1052 correspond to the depth of the end leaf node.

A creation rule of the table 1102 is the same as that of FIG. 5C. More specifically, as there are two null nodes 218 by copying null node 218 in FIG. 5C, two null nodes 1018 exist by copying null node 1018. For instance, assuming a case of creating a table in accordance with the generation rule shown in FIG. 5D, the two null nodes 1018 in FIG. 10B are replaced with the information of the node 1014.

Figure 11:
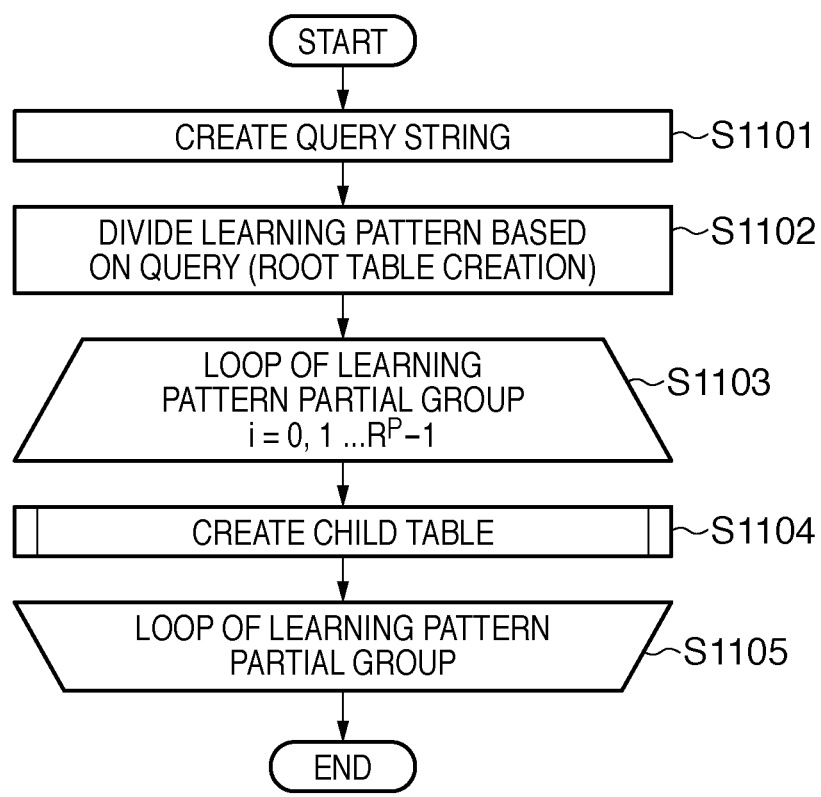
FIG. 11 is a flowchart describing processing according to the fifth embodiment.

FIG. 11 shows a flowchart describing the processing according to the present embodiment. First, a root table (the part above the thick line 1050 in FIG. 10A, or the part boxed by the square 1100 in FIG. 10B) is created. In root table creation, a predetermined number of queries (query string) are created in step S1101. For instance, in a case of FIG. 10B, two query strings are created in step S1101, as the root table has two steps. In step S1102, a learning pattern is divided based on the query strings (first table generation process).

More specifically described with reference to FIGS. 10A and 10B, a group including all learning patterns (P1013, P1016, P1017 and P1023) is divided into the following four partial groups. The four partial groups are: a group including the learning pattern P1013, a group including the learning patterns P1016 and P1017, an empty group, and a group including the learning pattern P1023.

In general, the number of partial groups divided by one query is R (equivalent to the number of branches in a tree), and the number of queries is P. Accordingly, the number of learning pattern's partial groups divided from the root table is $R^P$.

In the example shown in FIGS. 10A and 10B, since R=2 and P=2 stand, the number of divided learning pattern's partial groups is $2^2$=4.

Next, a table is created with respect to all learning pattern's partial groups, considering that they are learning patterns (second table generation process). This is the routine from steps S1103 to S1105. In step S1104 of the loop, a table is created for each learning pattern. In the case of FIG. 10B, the tables 1101 to 1104 are created. For the subroutine in step S1104, more specifically, the flowcharts in FIGS. 6A and 6B are called.

Note that the embodiment which has been described with reference to FIGS. 10A, 10B and 11 shows an example in which two layers of tables are combined. The number of layers is not limited to two, and the nature of the present embodiment does not change even if three or more layers of tables are combined.

Sixth Embodiment

In the above-described embodiments, a tree is first created, and then, a corresponding table is created. According to this method, a pattern recognition algorithm at higher speed with maintained performance can be realized. On the contrary, in the present embodiment, a table is directly created first, and a converted table is created next. According to this method, a high-performance pattern recognition algorithm with maintained high speed can be realized.

Figure 12:
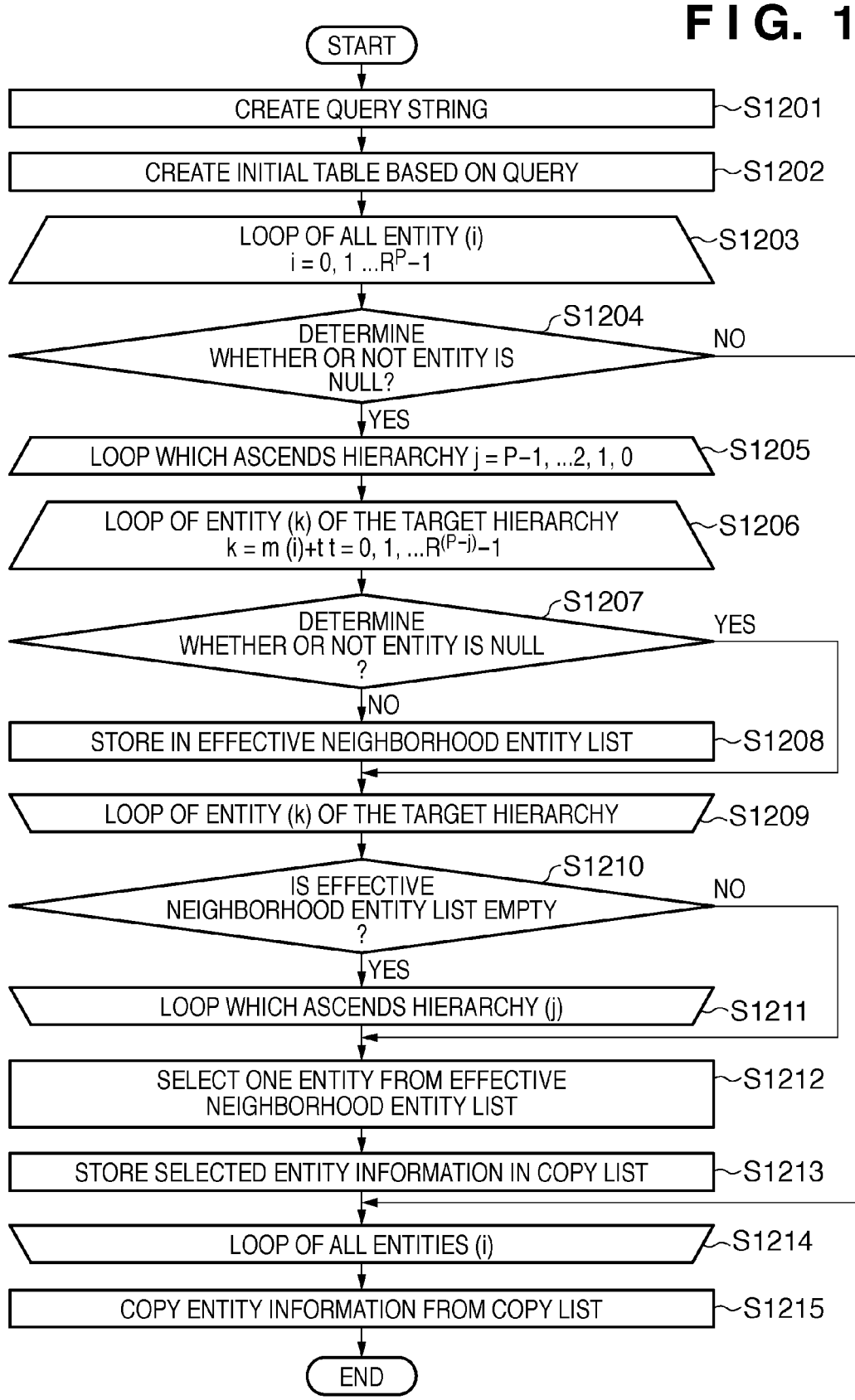
FIG. 12 is a flowchart describing processing according to the sixth embodiment.
Figure 13A:
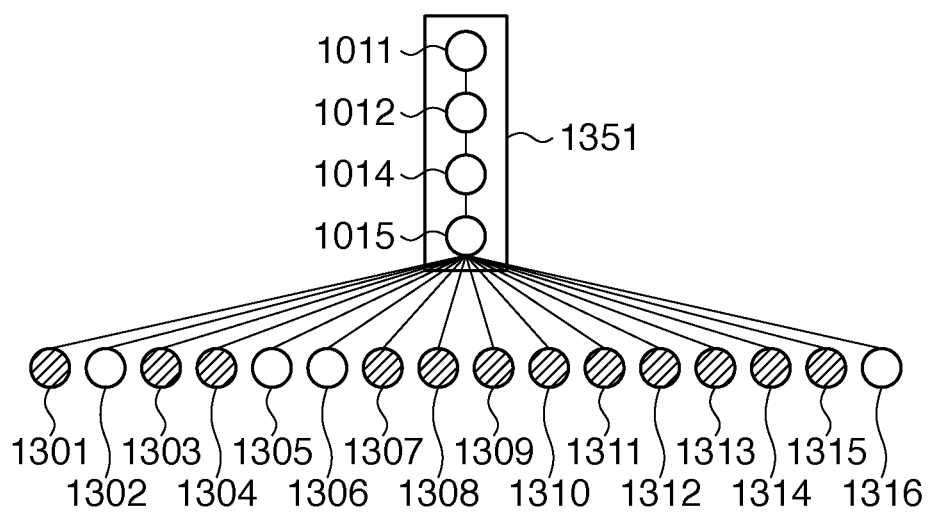
FIGS. 13A and 13B are exemplary views of a created table.
Figure 13B:
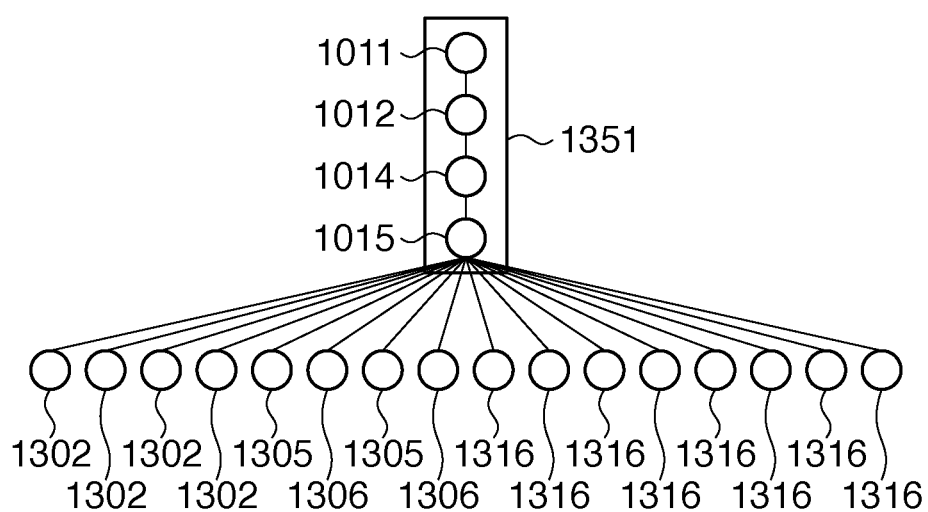

FIG. 12 shows a flowchart describing the processing according to the present embodiment. FIGS. 13A and 13B show exemplary views of a created table. Assume that the tables in FIGS. 13A and 13B are created by using the same learning patterns as that of FIGS. 10A and 10B. In other words, the tables in FIGS. 13A and 13B are created with the use of the learning patterns P1013, P1016, P1017 and P1023.

In step S1201, a predetermined number of query strings are created. In the case of FIGS. 13A and 13B, four query strings are created. Assume that the four query strings 1351, which are boxed by a square in FIG. 13A, are the same as the query strings in the nodes 1011, 1012, 1014 and 1015 in FIG. 10A, and thus have the same numerals.

Next, in step S1202, an initial table is created based on the query string created in the previous step. An example of the initial table is shown in FIG. 13A. While entities indicated by white circles in FIG. 13A are entities storing learning patterns, entities indicated by hatched lines are null entities having no learning pattern.

As a result, the number of created entities is generally $R^P$. In the case of FIG. 13A, since R=2 and P=4 stand, $2^4$=16 entities (1301 to 1316) are created as a result. Note that the initial table in FIG. 13A is drawn in conformity to the tree shown in FIG. 10A. More specifically, the leaf node 1013 corresponds to the entity 1302, the leaf node 1016 corresponds to the entity 1305, the leaf node 1017 corresponds to the entity 1306, and the leaf node 1023 corresponds to the entity 1316. In the initial table, 12 out of 16 entities are null entities.

The important point here is in that, while a query is not executed if there is one learning pattern left in FIG. 10A, four queries indicated by the nodes 1011, 1012, 1014 and 1015 are always executed in FIG. 13A.

Assuming that split to the left in a query is expressed by 0 and split to the right is expressed by 1, entities 1301 to 1316 are expressed by four-digit binary numbers 0000 to 1111. FIG. 14 is a table showing a corresponding relation between binary indications of splits in a query, and entity numbers. The left column shows numbers in binary indications, and the right column shows corresponding entity numbers. For instance, a binary indication of the entity 1302 is 0001, which means that it split to the left in the first three queries, and split to the right in the last query. Contrary, in FIG. 10A, initial two times of splitting leaves one learning pattern, and queries thereafter are not executed.

The binary indication of the entity 1316 is 1111, which means that all four queries split to the right. Contrary, in FIG. 10A, initial three times of splitting leaves one learning pattern, and the last fourth query is not executed.

Referring back to the flowchart in FIG. 12, by executing the routine from steps S1203 to S1215, a final table, to which an initial table is converted, is created. More specifically, a table in which a learning pattern is stored in all entities as shown in FIG. 13B is created.

In the loop from steps S1203 to S1214, all entities constituting the initial table are checked. In step S1204, it is determined whether or not the target entity is a null entity. If not a null entity, in other words, if it is an entity having learning pattern information, the processing jumps to step S1214 to proceed to the processing of the next entity.

If the target entity is a null entity in the determination in step S1204, the routine from step S1205 to S1213 is executed. Herein, for describing an algorithm, a concept of a table hierarchy and a neighborhood entity is explained. The "hierarchy" in steps S1205 and S1206 means a table hierarchy.

A table hierarchy indicates the top to bottom hierarchy of queries constituting a table. More specifically, the table shown in FIG. 13B has four hierarchies in total, which correspond to four query nodes 1011, 1012, 1014 and 1015. In the following description, same numerals are used for the table hierarchy numbers and node numbers.

A neighborhood entity means an entity which is logically close in a table. Herein, "logically close" means that entities become one same entity in a case where the target hierarchy has no lower hierarchy. In the aforementioned binary indication, it means that the upper bits have same numerals.

More specifically, the neighborhood entity with respect to the hierarchy 1015 of the entity 1301 in FIG. 13A is entity 1302. It is because, in binary indication, the entities 1301 and 1302 both have "000" in the upper three bits.

Further, the neighborhood entities with respect to the hierarchy 1014 of the entity 1301 are entities 1302, 1303 and 1304. It is because, in binary indication, the entities 1301 to 1304 all have "00" in the upper two bits.

Further, for instance, the neighborhood entity with respect to the hierarchy 1015 of the entity 1307 is entity 1308. It is because, in binary indication, the entities 1307 and 1308 both have "011" in the upper three bits.

Further, the neighborhood entities with respect to the hierarchy 1014 of the entity 1307 are entities 1305, 1306 and 1308. It is because, in binary indication, the entities 1305 to 1308 all have "01" in the upper two bits.

Moreover, the neighborhood entities with respect to the hierarchy 1012 of the entity 1307 are entities 1301 to 1306 and 1308. It is because, in binary indication, the entities 1301 to 1308 all have "0" in the upper one bit.

A description is provided referring back to the flowchart in FIG. 12. The loop from step S1205 to S1211 is a loop which ascends the table hierarchy. For example, in FIG. 13B, the loop ascends from the hierarchy 1015 to 1011. In this loop, the loop from steps S1206 to S1209 is a loop for circulating the neighborhood entities with respect to the target hierarchy. In step S1207, it is determined one by one whether or not the neighborhood entity with respect to the target hierarchy is a null entity. If there is a neighborhood entity that is not a null entity, it is stored in an effective neighborhood entity list in step S1208.

After all neighborhood entities with respect to the target hierarchy are checked, the loop from steps S1206 to S1209 ends, and the processing proceeds to step S1210. In step S1210, it is checked whether or not the effective neighborhood entity list is empty. If the list is empty, the processing proceeds to step S1211, and if it can ascend to a higher hierarchy, the processing returns to step S1205. If the list is not empty, the loop ends, and the processing proceeds to step S1212. Note that if there is an entity that is not null in the initial table, it means that there is at least one node that is not null among neighborhood entities with respect to the highest hierarchy.

In step S1212, an entity to be copied is selected from the effective neighborhood entity list. In step S1213, information of the entity selected in step S1212 is stored in the copy list. In the entity selection in step S1212, basically an entity can be selected at random, or an entity may be selected with the use of some evaluation function.

When the loop in step S1214 ends, the entity information stored in the copy list is copied to the target entity of the initial table in step S1215. The reason of such roundabout way is in that, if entity information should directly be copied to the initial table in step S1213, the checking in step S1207 would be performed based on the information different from the initial table. Note that the entity information copied from the copy list in step S1215 may be of tangible memory information or a pointer. The reason that the entity information may be of a pointer is because copied entity information always exists in the initial table.

As has been described above, by virtue of copying effective neighborhood entity information from the initial table, all entities are filled with learning pattern information. Accordingly, a situation of falling into a null entity having no recognition result will not occur; therefore, it is possible to create a table achieving higher performance.

Seventh Embodiment

Figure 15A:
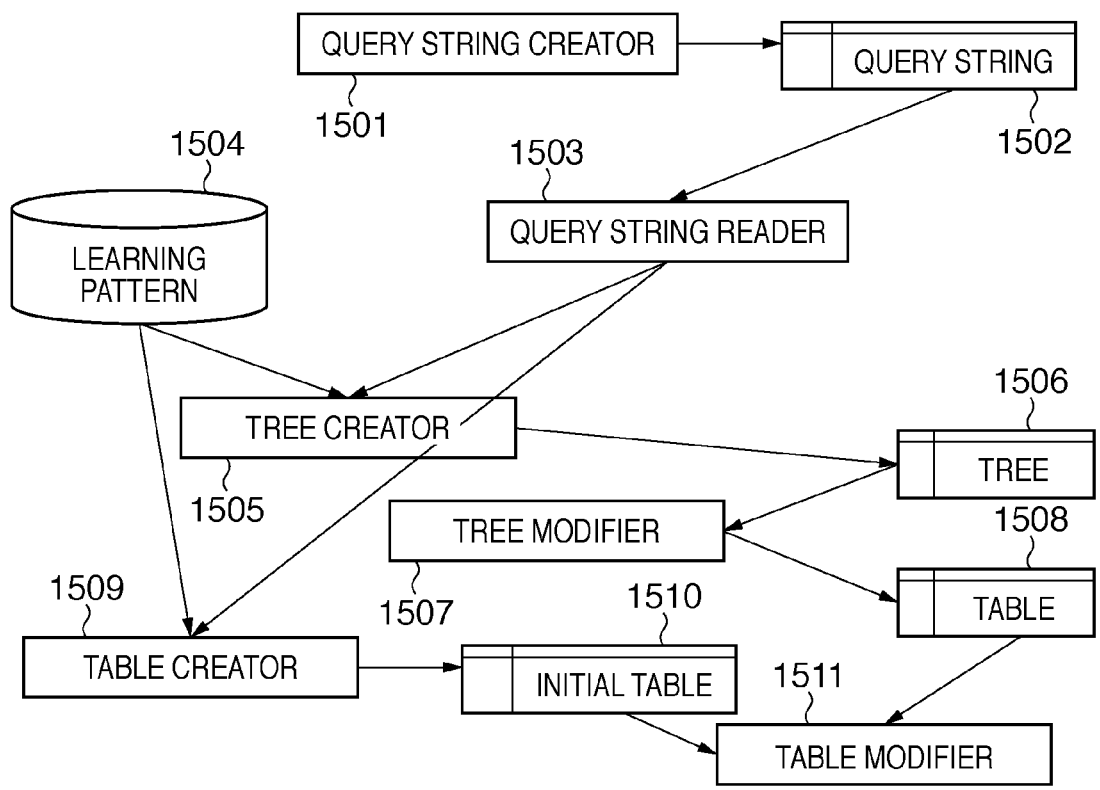
FIG. 15A is a view showing an exemplary configuration of a discriminator creation apparatus.

A brief configuration of an apparatus which realizes the above-described embodiments will be described with reference to FIGS. 15A and 15B. FIG. 15A shows an exemplary configuration of a discriminator creation apparatus, and FIG. 15B shows an exemplary configuration of a recognition apparatus.

A query string creator 1501 in FIG. 15A creates a query string 1502. A query string reader 1503 reads the query string 1502 created by the query string creator 1501. The query string 1502, which has been read by the query string reader 1503, is further read by a tree creator 1505 or a table creator 1509 from the query string reader 1503. The tree creator 1505 creates a tree 1506 by dividing a learning pattern 1504 in accordance with the read query string 1502. Next, based on a tree 1506 which has been created by the tree creator 1505, a tree modifier 1507 makes part or all of the tree 1506 into a table 1508. The table creator 1509 creates an initial table 1510 by dividing the learning pattern 1504 in accordance with the read query string 1502. Next, a table modifier 1511 converts the initial table 1510, which has been created by the table creator 1509, to a table 1508.

The correspondence between the aforementioned configuration and the flowcharts is explained. The query string creator 1501 corresponds to the processing of S101 in FIG. 1; and the query string reader 1503 corresponds to the processing of S106 in FIG. 1. Further, the tree creator 1505 corresponds to the processing from S103 to S113 in FIG. 1. The tree modifier 1507 corresponds to the processing from S602 to S611 in FIGS. 6A and 6B. Moreover, the table creator 1509 corresponds to the processing of S1202 in FIG. 12; and the table modifier 1511 corresponds to the processing from S1203 to S1215 in FIG. 12.

Figure 15B:
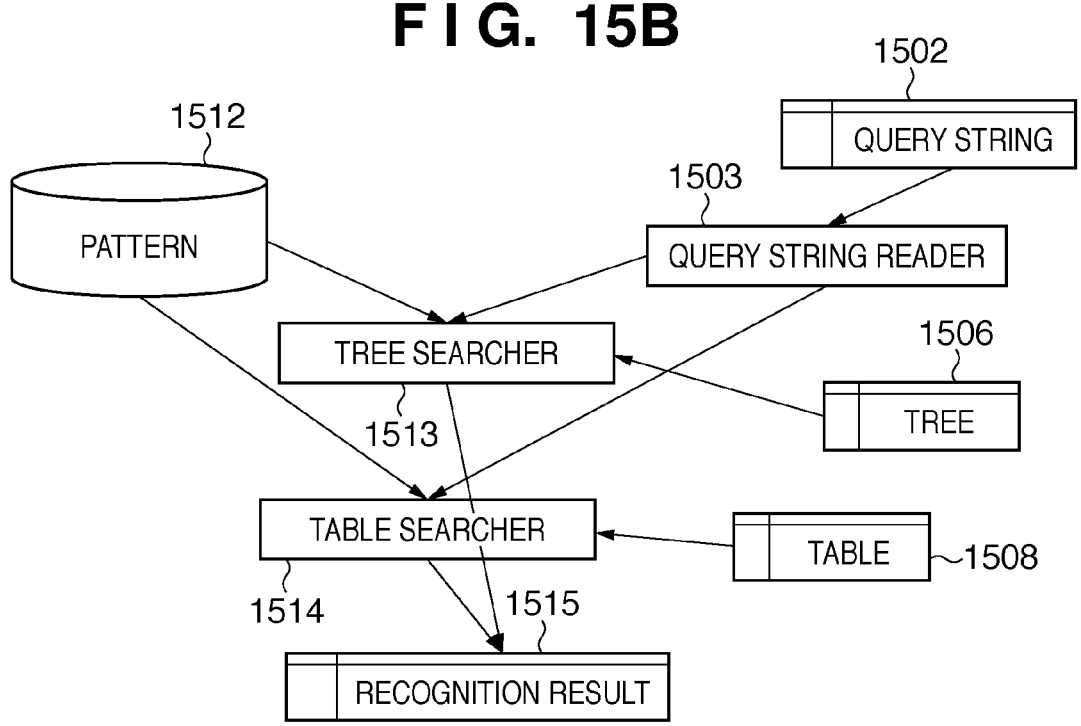
FIG. 15B is a view showing an exemplary configuration of a recognition apparatus.

The recognition apparatus shown in FIG. 15B mainly comprises a tree searcher 1513 and a table searcher 1514. The tree searcher 1513 and the table searcher 1514 read a query string 1502, which has been created in advance, through the query string reader 1503. The tree searcher 1513 and the table searcher 1514 recognize a pattern 1512 having an unknown class based on the read query string 1502, and obtain a recognition result 1515. In this stage, the tree searcher 1513 employs the tree 1506, which has been created by the discriminator creation apparatus shown in FIG. 15A. Moreover, the table searcher 1514 employs the table 1508, which has been created by the discriminator creation apparatus shown in FIG. 15A.

The correspondence between the aforementioned configuration and the flowcharts is explained. The tree searcher 1513 corresponds to the processing from S305 to S309 in FIG. 3B. The table searcher 1514 corresponds to the processing from S702 to S703 in FIG. 7A.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183383, filed Aug. 18, 2010, which is hereby incorporated by reference herein in its entirety.

What is claimed is:

1. An information processing apparatus for generating a tree structured discriminator which has a plurality of nodes, comprising:
    an obtaining unit configured to obtain a plurality of learning patterns;
    a query obtaining unit configured to obtain a predetermined number of queries, wherein the queries classify the plurality of patterns;
    a determination unit configured to determine whether there is an obtained query which corresponds with a layer of a target node;
    a first allocation unit configured to allocate obtained query to the target node in a case that the determination unit determines that there is the obtained query which corresponds with the layer of the target node;
    a query generation unit configured to generate a query when the determination unit determines that there is not the obtained query which corresponds with the layer of the target node; and
    a second allocation unit configured to allocate the generated query to the target node in a case that the determination unit determines that there is not the obtained query which corresponds with the layer of the target node.

2. The information processing apparatus according to claim 1, further comprising:
    a recognition unit configured to perform pattern recognition using the plurality of queries which constitute the tree structure.

3. The information processing apparatus according to claim 1, wherein said first allocation unit classifies a learning pattern set in the target node in a case that the determination unit determines that there is the obtained query which corresponds with the layer of the target node.

4. The information processing apparatus according to claim 3, wherein said query generation unit generates a new query corresponding to the learning pattern in the respective nodes in a case that the determination unit determines that there is not the obtained query which corresponds with the layer of the target node.

5. The information processing apparatus according to claim 1, wherein,
    said first allocation unit generates a new node by classifying a learning pattern set in the new current node in accordance with the allocated query.

6. The information processing apparatus according to claim 1, wherein the learning pattern is a learning image.

7. The information processing apparatus according to claim 1, wherein the node is a weak discriminator.

8. The information processing apparatus according to claim 1, wherein the query is generated based on an i-th dimensional value.

9. The apparatus according to claim 1, wherein the first allocation unit allocates the obtained query as a common query to all nodes included in the layer of the target node.

10. An information processing apparatus for generating a discriminator which has a plurality of nodes, comprising:
    an obtaining unit configured to obtain a plurality of learning patterns;

a query obtaining unit configured to obtain a plurality of queries, wherein the queries classify the plurality of learning patterns;

a first determination unit configured to determine whether a layer number of a target node is larger than a predetermined number;

a first allocating unit configured to allocate an obtained query which corresponds to the layer number of the target node, in a case that the determination unit determines that the layer number of the target node is not larger than the predetermined number; and a second determination unit configured to determine whether a learning pattern exists in respective nodes in the layer of the target node in a case that the first determination unit determines that the layer number of the target node is larger than the predetermined number; and a second allocation unit configured to allocate the obtained query which corresponds to the layer number of the target node to a node in which the learning pattern exists as.

11. The information processing apparatus according to claim 10, wherein the learning pattern is a learning image.

12. The information processing apparatus according to claim 10, wherein the node is a weak discriminator.

13. The information processing apparatus according to claim 10, wherein the query is generated based on an i-th dimensional value.

14. The apparatus according to claim 10, wherein the first allocation unit allocates the obtained query as a common query to all nodes included in the layer of the target node, and the second allocation unit allocates the obtained query to only the nodes in which the learning pattern exists.

15. An information processing method for generating a tree structured discriminator which has a plurality of nodes, comprising:

an obtaining step of obtaining a plurality of learning patterns;

a query obtaining step of obtaining a predetermined number of queries, wherein the plurality of queries classify the plurality of learning patterns;

a determination step of determining whether there is an obtained query which corresponds with a layer of a target node;

a first allocation step of allocating the obtained query to the target node in a case that the determination unit determines that there is the obtained query which corresponds with the layer of the target node; and a query generation step of generating a query when the determination step determines there is not the obtained query which corresponds with the layer of the target node; and a second allocation step configured to allocate the generated query to the target node in a case that the determination step determines that there is not the generated query which corresponds with the layer of the target node.

16. A non-transitory computer-readable storage medium storing a program for having a computer execute the information processing method described in claim 15.

17. An information processing method executed by an information processing apparatus for generating a discriminator which has a plurality of nodes, the method comprising:

an obtaining step of obtaining a plurality of learning patterns;

a query obtaining step of obtaining a plurality of queries, wherein the queries classify the plurality of learning patterns;

a first determination step of determining whether a layer number of a target node is larger than a predetermined number;

a first allocating step of allocating an obtained query which corresponds to the layer number of the target node in a case that the determination step determines that the layer number of the target node is not larger than the predetermined number;

a second determination step of determining whether a learning pattern exists in respective nodes in the layer of the target node in a case that the first determination step determines that the layer number of the target node is larger than the predetermined number; and a second allocation step of allocating the obtained query which corresponds to the layer number of the target node to a node in which the learning pattern exists.

18. A non-transitory computer-readable storage medium storing a program for having a computer execute the information processing method described in claim 17.

* * * * *